United States Patent [19]

Harada

[11] Patent Number: 5,438,407
[45] Date of Patent: Aug. 1, 1995

[54] SPECTROMETER AND APPARATUS INCLUDING THE SPECTROMETER

[75] Inventor: Yoichi Harada, Tokyo, Japan
[73] Assignee: Seiko Instruments Inc., Tokyo, Japan
[21] Appl. No.: 197,485
[22] Filed: Feb. 16, 1994
[30] Foreign Application Priority Data Feb. 16, 1993 [JP] Japan ................... 5-026585

[51] Int. Cl.⁶ ........................... G01J 3/28; G01J 3/32
[52] U.S. Cl. ................................. 356/328; 356/300
[58] Field of Search ............... 356/326, 328, 330-334, 356/300

[56] References Cited

U.S. PATENT DOCUMENTS 3,385,160  5/1968  Dawson et al. ............... 356/328
4,191,473  3/1980  Hansch ......................... 356/300

OTHER PUBLICATIONS

Denton et al, "Charge-Injection, and Charge Coupled Devices in Practical Chemical Analysis", 1983, American Chemical Society.

Primary Examiner—Vincent P. McGraw
Assistant Examiner—K. P. Hantis
Attorney, Agent, or Firm—Spensley Horn Jubas & Lubitz

[57] ABSTRACT

A wavelength sub-dispersive device receives light from a standard light source producing light having a narrow bandwidth and having an intensity greater than that of light to be detected. The sub-dispersive device is provided for identifying the wavelength of the dispersed light by a main dispersive device, which is detected by a main detector. Light from the standard light source does not irradiate the main detector. If the main detector is irradiated with the light from the standard light source, the detection of the main detector is disturbed by its high intensity.

11 Claims, 5 Drawing Sheets

SPECTROMETER AND APPARATUS INCLUDING THE SPECTROMETER

BACKGROUND OF THE INVENTION

In relation to a spectrometer whose operation is influenced by the wavelength of light, the present invention specifically relates to a spectrometer with a location detecting device. More specifically, the invention relates to assigning the wavelength location of diffracted light which is diffracted by a wavelength dispersion, or scattering, element in the spectrometer.

For radiation dispersion, a reflection type diffraction grating (a main grating) with, more or less, 1800–4800 grooves or lines/mm is used. For a wavelength dispersion sub-element, a flat surface sub-diffraction grating with, more or less, 10–100 grooves or lines/mm is used. The sub-diffraction grating is securely connected to, and driven with, the main grating. The location detection of the main grating is the detection of the outgoing angular spread of dispersed light, and the detected dispersed wavelength is precisely assigned by a detector.

The light to be dispersed is admitted through an incident, or inlet, slit. The light admitted through the incident slit exits via an outlet slit after dispersion by the main grating, and is detected by a main detector. At this moment, the intensity of light at a selected wavelength can be measured by way of letting it pass through the outlet slit.

The sub-diffraction grating receives light with a narrow bandwidth (the light for detection) such as laser radiation for location detection. The light which is acted on by the sub-diffraction grating is admitted into a sub-detector having a multiple number of detection elements in line towards the dispersion direction after diffraction by the sub-diffraction grating. Since the number of grooves in the sub-diffraction grating is smaller than the number in the main grating, multiple degrees of diffraction light is diffracted by the sub-diffraction grating.

The interval between diffraction lines which are admitted into the sub-diffraction grating is determined by the driving position of the sub-detector, the number of grooves on the sub-diffraction grating, the wavelength of light source, the distance between the sub-diffraction grating and the sub-detector, etc. Since the diffraction lines traverse, one by one, the sub-detector as a result of the driving of the sub-diffraction grating, the location detection of the wavelength dispersion element with usage of the diffraction lines can be detected by way that the interval between diffraction lines and the width of the sub-detector are set, always with more than one diffraction line admitted onto the sub-detector and with the main diffraction grating and the sub-diffraction grating secured to, and driven concurrently with, each other.

The density of the detected lines is far larger than that of the dispersion lines.

Therefore, in case that a detected line can be detected by the main detector simultaneously, the detected light which is admitted into the main detector can create interference for the detection of light for detection.

SUMMARY OF THE INVENTION

Objects of the invention are to provide are to provide a spectrometer which operates in an improved manner.

The above and other objects of the invention are achieved by providing one or any combination of the following:

1. The wavelength of the detection light, i.e. the light to be detected by the sub-detector, is selected to not be detected by the main detector;
2. The filter which absorbs only light at the wavelength for detection is positioned in front of the main detector which detects the dispersed light;
3. The location detection is carried only with admittance of the light limited to only when the spectrometer is driven.

The operation of the above structure is as follows.

1. The main detector does not detect the detection light.
2. The wavelength of the detection light is absorbed.
3. While dispersion measurement is carried, the detection of light is not admitted.

By the above measures, interference in the detection of light to be dispersed can be prevented. Therefore, the accuracy in the dispersion analysis of the light is improved.

DESCRIPTION OF THE PREFERRED EMBODIMENTS

Embodiments of the invention will be described below according to the Figures.

Figure 1:
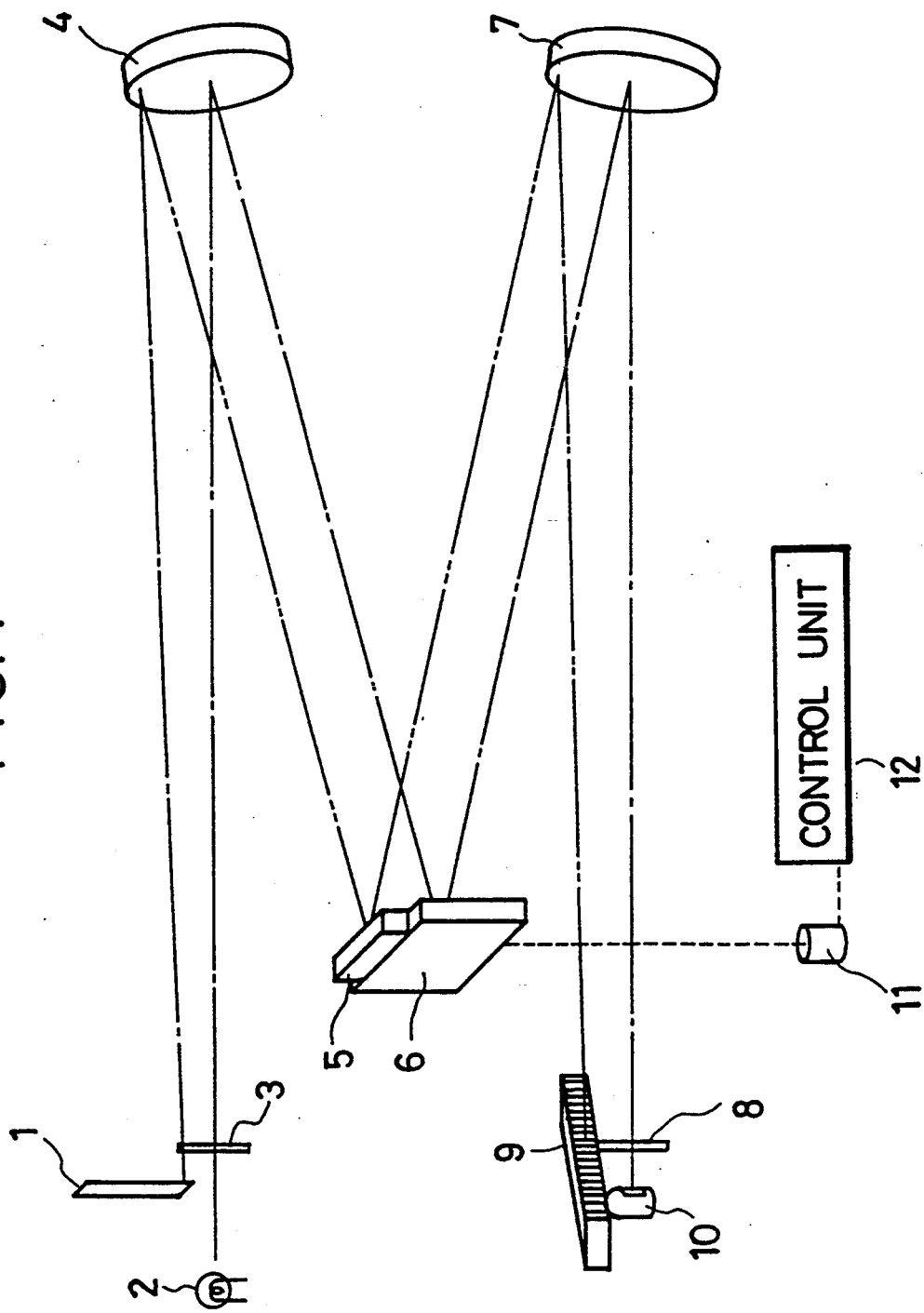
FIG. 1 shows a perspective view of a first embodiment of the invention.

Referring to FIG. 1, an incident slit 3 admits light to be dispersed from a light source 2 so that the light to be dispersed, or scattered, is in the shape of a beam. As the dispersion light, light for atomic absorption analysis, light for ICP emission spectral analysis, light for infrared spectroscopic analysis, or other light can be used.

The light for dispersion from incident slit 3 is directed onto a main diffraction grating 6 after having been collimated by means of a camera mirror 4 which is a concave mirror. The main diffraction grating 6 is the reflection type diffraction grating with, more or less, 1800–4800 grooves/mm (grooves are also called slits) which are parallel to the direction of the incident slit.

The light for dispersion which is directed onto the main diffraction grating 6, after dispersion, or diffraction, by the main diffraction grating 6, is directed to a collimator mirror 7 which collects or concentrates the dispersed light again, and then through an outlet slit 8, and finally is detected by a main detector 10 which is behind the outlet slit 8.

At this moment, the main diffraction grating 6 is rotatable in the diffraction direction by a driving unit 11, and the rotation itself can precisely controlled by control unit 12, so that a selected wavelength of light is directed through the outgoing slit 8, and its intensity can be measured, that is, the spectrum of the light for analysis (which is to the dispersed) is measured.

A light source 1 which generates light of a very narrow wavelength is disposed above (the lower position can also be selected) the light from source 2 to allow the light from source 2 to be admitted into the incident slit 3. The light with the narrow wavelength which is generated by light source 1 (e.g. a laser) passes through the incident slit 3, and is vertically collimated by mirror 4, while it becomes gradually wider in the horizontal direction because of the diffraction. The light for dispersion which is collimated by mirror 4 is diffracted into multiple lines. On the sub-diffraction grating, more or less 10–100 grooves/mm are set in the same direction as ones on the main diffraction grating. The light diffracted by the sub-diffraction grating forms an image on the sub-detector 9 after reflection by the collimator mirror 7.

The sub-diffraction grating 5 is fixed at the upper side (the lower side can also be acceptable) of the main diffraction grating 6, and is driven by the driving unit 11 in unison with the main diffraction grating 6.

In accordance with the simultaneous driving (i.e. rotation) of the sub-diffraction grating 5 and the main diffraction grating 6, multiple number of diffracted lines traverse sub-detector 9. This is because the multiple number of the diffracted lines is generated due to the occurrence of the higher diffracted light.

Since the wavelength of the detected light is already known, once the location at a certain point is recognized, the location of the main diffraction grating 6 can be detected by the information both of the number of the diffracted line traversed and of the location of the diffracted line.

As for the main detector 10, a photomultiplier is generally used in the most cases. The wavelength detection range of the photomultiplier is determined according to its photoelectric surface. For example, in case of a photomultiplier which is more highly sensible to vacuum infrared rays, some of the photomultiplier has no detection sensitivity in the ultraviolet (ray) range. Utilizing this possibility, for the light to be detected in sub-detector 9 there is chosen light having a wavelength which cannot be detected by the main detector 10. For example, certain semiconductor lasers which are mostly used in the field of optical communications produce infrared wavelength radiation, and a photomultiplier which has higher sensitivity in the ultraviolet ray range cannot detect the infrared light of a semiconductor laser. As for the sub-detector 9, this can be a detector which has a strong sensitivity to infrared radiation wavelengths used in optical communications, that is a detector which is used in the field of optical communications. In case that the infrared light is expected to be detected and to be dispersed in the main detector 10, ultraviolet light is applied as to the detected light and a detector which has strong sensitivity to ultraviolet as for the sub-detector 9.

Based on the above, since the wavelength of the detected light from source 1 is not detected by the main detector 10, the dispersion measurement can be carried out without any interference of the detected light.

Figure 2:
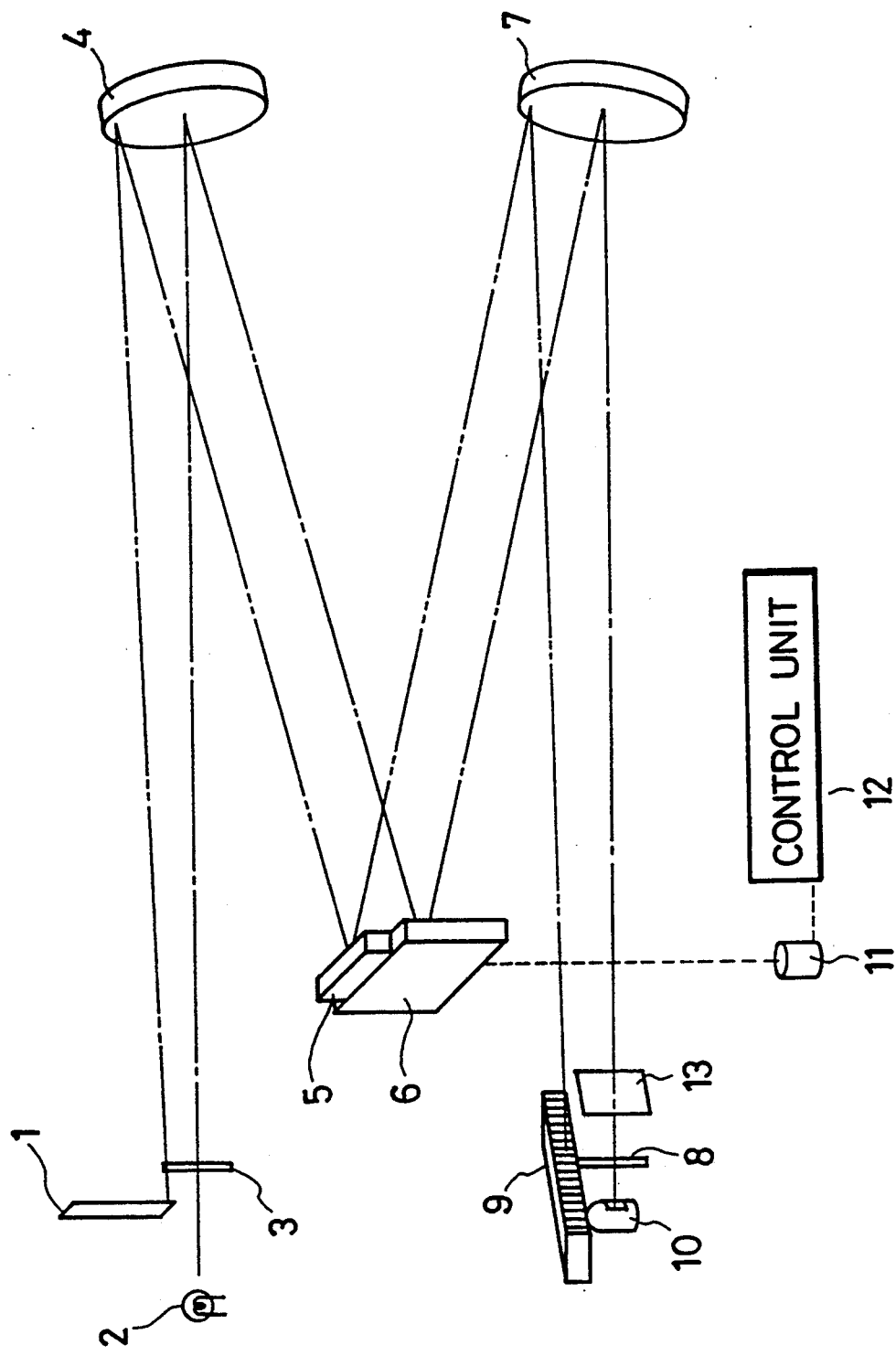
FIG. 2 shows a perspective view of a second embodiment of the invention.

FIG. 2 shows a second embodiment of this invention in which a filter 13 that absorbs only the wavelength of the detected light from source 1 is disposed in front of main detector 10. However, no filter should be disposed in front of sub-detector 9. Therefore, the dispersion measurement and the location detection of the main diffraction grating can be carried out without any interference of the detected light in the main detector 10.

Figure 3:
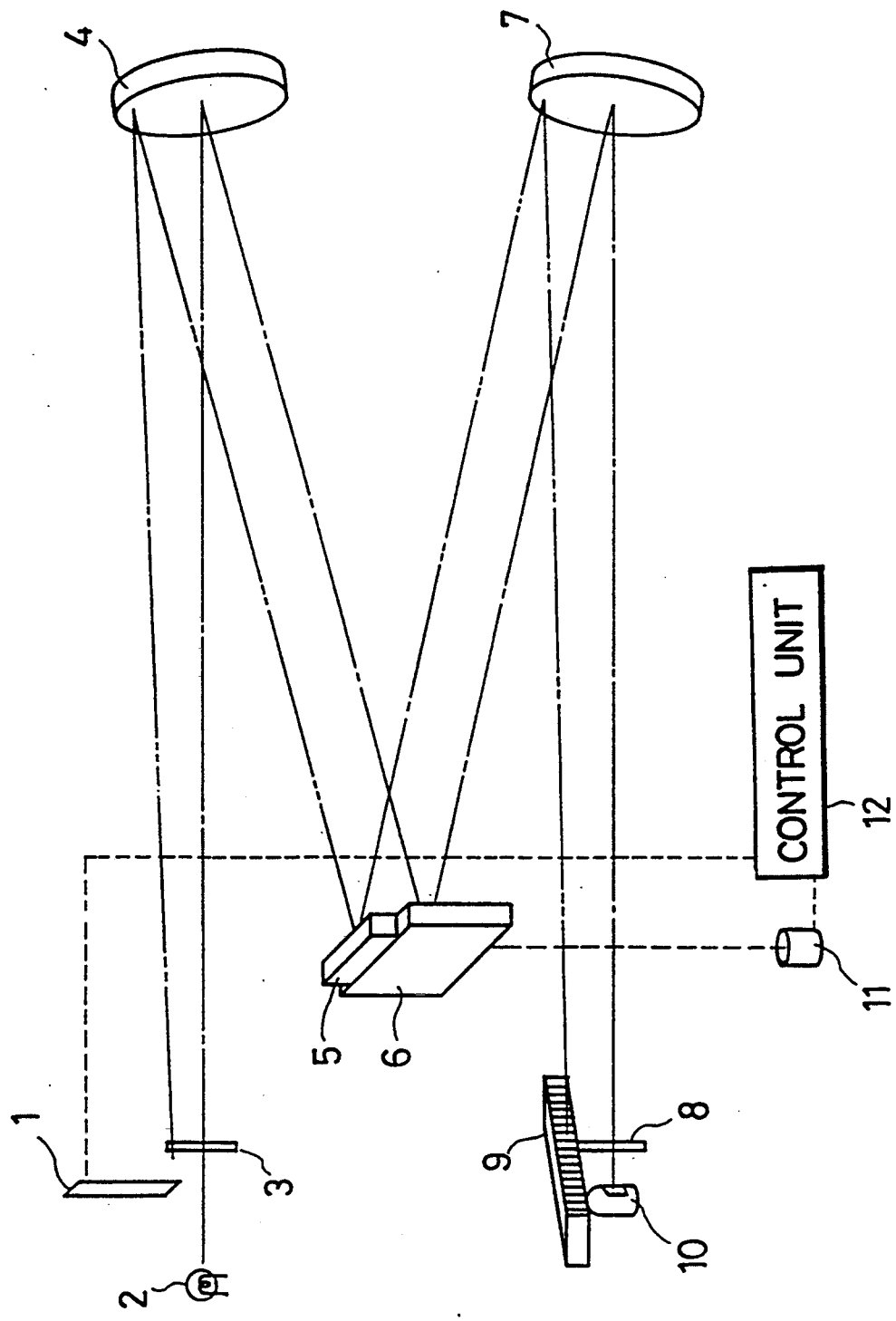
FIG. 3 shows a perspective view of a third embodiment of the invention.

FIG. 3 shows a third embodiment of the invention. Here, control unit 12 turns on light source 1 while unit 12 continues to drive the spectroscope, and location detection is performed. At the time of the dispersion measurement, the light source 1 is turned off and the dispersion measurement is carried out while the detected light is off.

Figure 4:
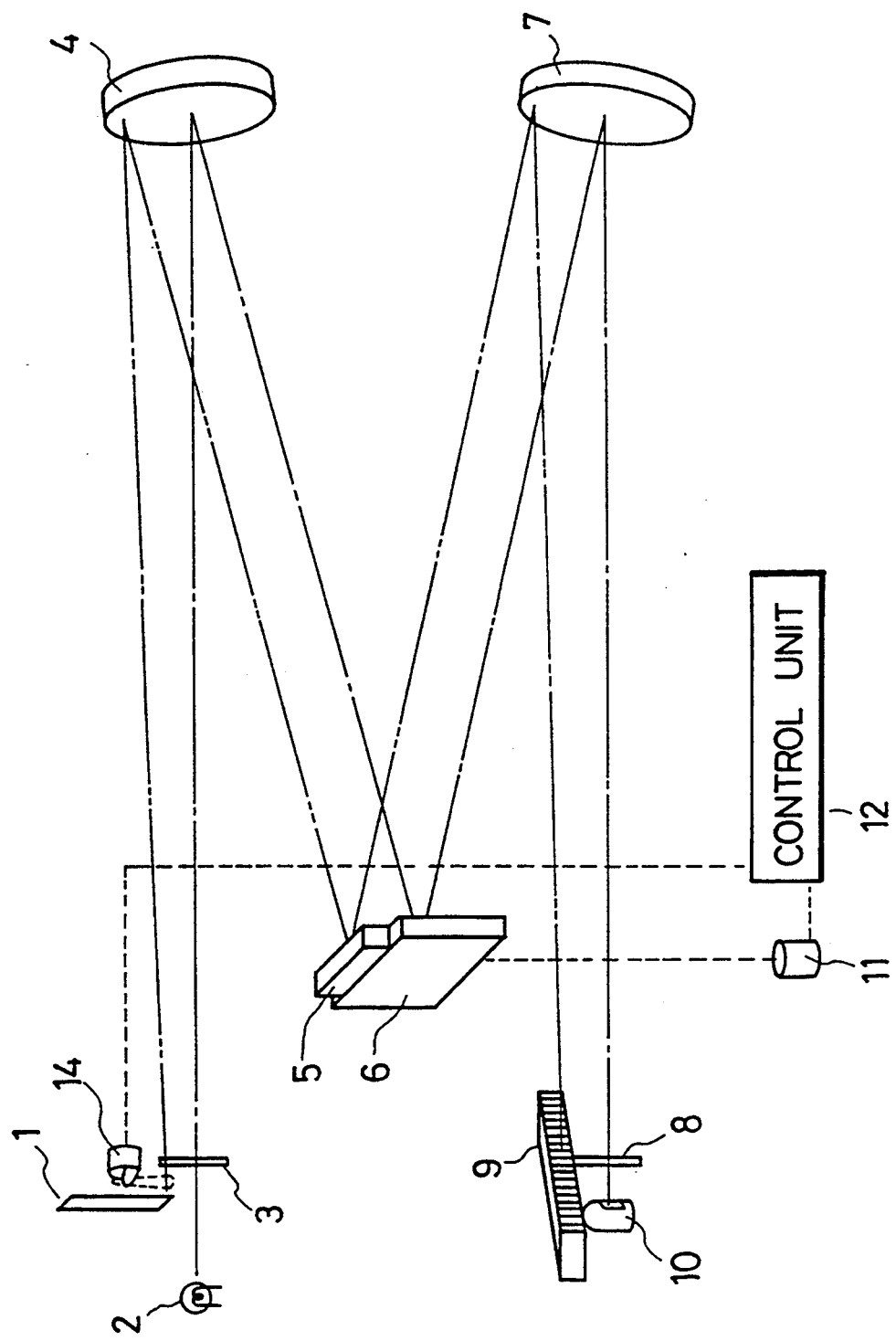
FIG. 4 shows a perspective view of a fourth embodiment of the invention.

FIG. 4 shows a fourth embodiment of the invention. In front of incident slit 3 there is provided a cut-off device 14 for blocking light from source 1. The controller 12 controls the cut-off device 14 in that it permits light to pass from source 1 for detection of the location, but it blocks light from source 1 during the measurement of dispersion.

Figure 5:
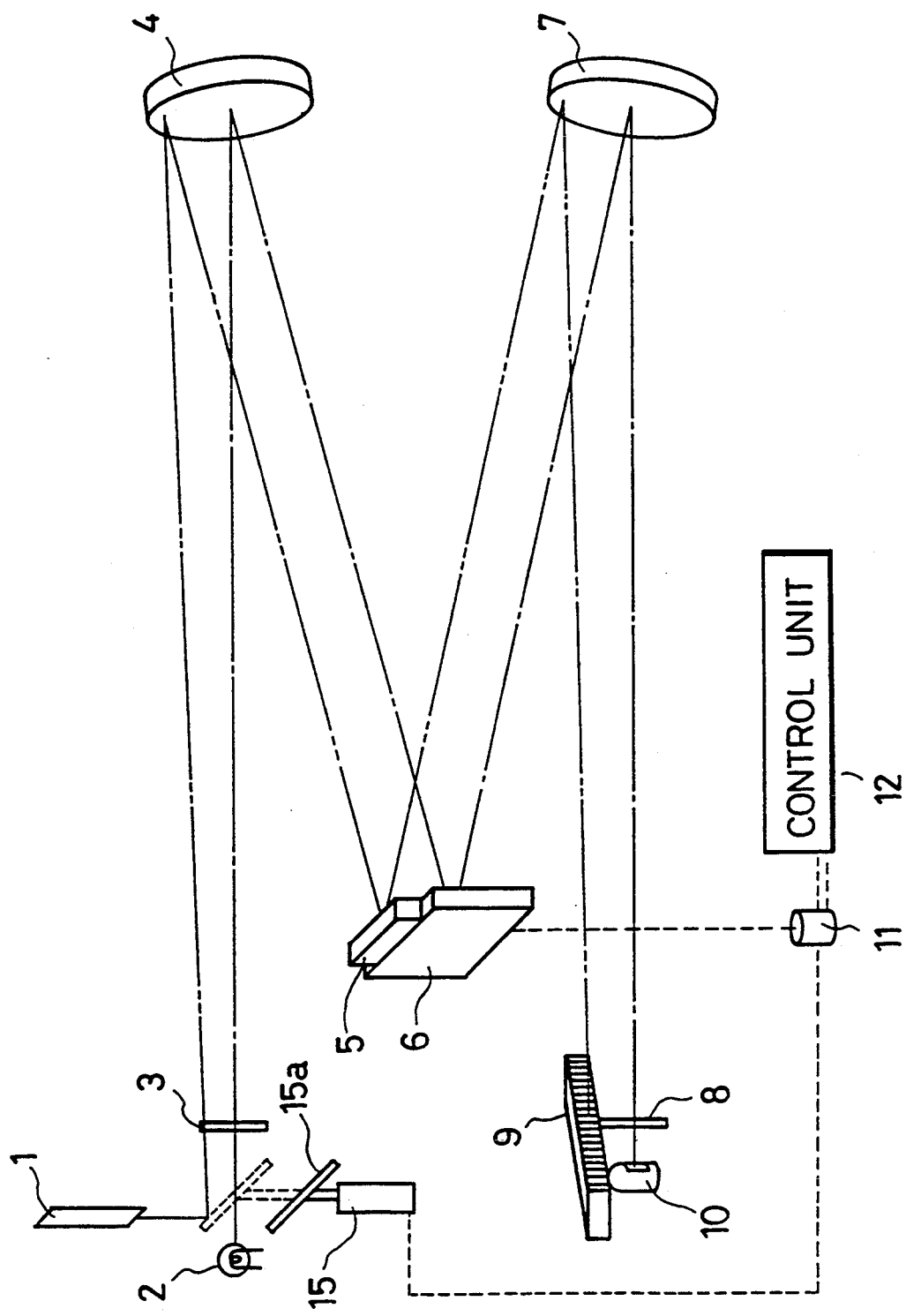
FIG. 5 shows a perspective view of a fifth embodiment of the invention.

FIG. 5 shows a fifth embodiment of the invention. Here, the direction of the beam from source 1 is reoriented to be transverse to the desired path through slit 3 and in front of incident slit 3, an optical path conversion device 15 is provided. Device 15 is operable, or switchable, to direct either the light to be detected from source 1 or the light to be dispersed from source 2 through incident slit 3. The optical path conversion device 15 can switch to admit either of the detected light or the light to be dispersed through the incident slit 3 by means of, for example, a mirror 15a which has a reflecting surface inclined at 45° to the direction of the light beams through slit 3 and the admittance of either of the beams through incident slit 3 is switched in dependence on whether the mirror is in the optical path or not. The control unit 12 controls the optical path conversion device 15 in that the light from source 1 is directed through slit 3 when mirror 15a is in the broken-line position and the light to be dispersed from source 2 is permitted to pass through slit 3 while the light from source 1 can no longer pass through slit 3 when mirror 15a is in the solid-line position.

In the embodiments of FIGS. 3 through 5, the measurement of the dispersion can be carried out because the admittance of the detected light to the sub-detector is controlled in terms of the time (timewise).

The cut-off device 14 and/or the optical path conversion device 15 can be located anywhere between the light sources and the main detector 10.

In case that the detection of the location and the measurement of the dispersion is to be carried out almost at the same time, a synchronized operation should be done after the time division by means of pulse lighting or a chopper.

The spectrograph applied in these embodiments may be of the Zelni-Turner type. Others types such as an Evert type or a Seya-Namioka type in which the dispersive device is rotated, can also be used. As for the dominant wavelength dispersive device, a flat surface diffraction grating can be employed as mentioned above, and other type ones such as concave surface type, transmission type, prism, etc, can be employed as well. The main diffraction grating 6 should ideally be placed at above or below the sub-diffraction grating 5, but other locations can also be employed. As for the camera-mirror 4 and collimator mirror 7, the same type of mirror can be applied for the main diffraction grating 6 and for the sub-diffraction grating 5. And respectively different types of mirrors can be employed as well. In case that different types of mirrors are used, flat surface or convex surface types can also be used as well other than concave surface types.

As for the light source 1, not only a coherent light laser but also narrow bandwidth type lamp such as a hollow cathode lamp or a mercury lamp can be used. The location of light source 1 can be at outer side of the incident slit 3 or at outer side of an opening other than the incident slit 3, at the inner side of the incident slit 3, at the location of camera mirror 4, or at the location of collimator mirror 7 as well.

The orientation with which light is directed the sub-diffraction grating 5 and to the sub-detector 9 can be perpendicular to the driving axis of unit 11 or can be at a certain inclination to it as well. The surface of sub-diffraction grating 5 can be at a certain inclination to the driving axis of unit 11 in accordance with the inclination of the entering light and the inclination of the outgoing light to the sub-detector 8.

The location of the sub-detector 9 can be near the outlet slit 8. Or it can be located adjacent collimator mirror 7, or at an appropriate location inside or outside of the spectrograph, as well. Or for the same purpose, some kind of reflective type of object for the dispersed high can be placed in between the main detector 10 and the outlet slit 8.

Without cutting off the dominant wavelength dispersive device and complementary wavelength dispersive device with absolutely separate action, or with no need of severely cutting off the detected light which is admitted to the main detector, interference of the detected light from source 1 to the main detector can be prevented.

The above-mentioned spectrometers are used in an inductively coupled plasma emission spectrometer or atomic absorption spectrometer.

This application relates to subject matter disclosed in Japanese Application number 5-26585, filed on Feb. 16, 1993, the disclosure of which is incorporated herein by reference.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed:

1. A spectrometer comprising: an incident slit through which an incident light to be spectrally investigated passes; a main wavelength dispersion element for dispersing the incident light passed through the incident slit; an outlet slit for passing only a desired wavelength component of the incident light; a main detector which detects the desired wavelength of the incident light; a driving unit for driving and rotating said main wavelength dispersion element in a direction of the dispersion; a control unit connected to said driving unit for controlling operation of said driving unit; a light source which generates a standard light having a narrow wavelength bandwidth as a standard wavelength and passing through said incident slit; a sub-wavelength dispersion element which diffracts the standard light and is driven with and secured on said main wavelength dispersion element; a sub-detector having a plurality of detecting elements in line of the sub-wavelength dispersing direction for detecting the diffracted light of the standard light; and means for preventing the standard light from reaching said main detector.

2. A spectrometer as claimed in claim 1 wherein said means for preventing the standard light from reaching said main detector comprise a filter which is disposed between said main detector and said sub-wavelength dispersion element in the light path for preventing only the standard light from reaching said main detector.

3. Inductively coupled plasma emission spectrometer comprising a spectrometer claimed in claim 2.

4. Atomic absorption spectrometer comprising a spectrometer claimed in claim 2.

5. Inductively coupled plasma emission spectrometer comprising a spectrometer claimed in claim 1.

6. Atomic absorption spectrometer comprising a spectrometer claimed in claim 1.

7. A spectrometer comprising: an incident slit through which an incident light to be spectrally investigated passes; a main wavelength dispersion element for dispersing the incident light passed through the incident slit, an outlet slit for passing only a desired wavelength component of the incident light; a main detector which detects the desired wavelength of the incident light; a driving unit for driving and rotating said main wavelength dispersion element in a direction of the dispersion; a control unit connected to said driving unit for controlling operation of said driving unit; a light source which generates a standard light having a narrow wavelength bandwidth as a standard wavelength; a sub-wavelength dispersion element which diffracts the standard light and is driven with and secured on said main wavelength dispersion element; a sub-detector having a plurality of detecting elements in line of the sub-wavelength dispersing direction for detecting the diffracted light of the standard light; and a device positionable in the path of the standard light for permitting the standard light to pass through said incident slit and to reach said sub-detector and said main detector only during a limited time.

8. Inductively coupled plasma emission spectrometer comprising a spectrometer claimed in claim 7.

9. Atomic absorption spectrometer comprising a spectrometer claimed in claim 7.

10. A spectrometer as claimed in claim 7 wherein said device is an optical path conversion device movable between: a first position for permitting incident light to pass through said incident slit while preventing the standard light from passing through said incident slit; and a second position for preventing incident light from passing through said incident slit while directing the standard light through said incident slit.

11. A spectrometer comprising: an incident slit through which an incident light to be spectrally investigated passes; a main wavelength dispersion element for dispersing the incident light passed through the incident slit, an outlet slit for passing only a desired wavelength component of the incident light; a main detector which detects the desired wavelength of the incident light; a driving unit for driving and rotating said main wavelength dispersion element in a direction of the dispersion; a control unit connected to said driving unit for controlling operation of said driving unit; a light source which generates a standard light having a narrow wavelength bandwidth as a standard wavelength and passing through said incident slit; a sub-wavelength dispersion element which diffracts the standard light and is driven with and secured on said main wavelength dispersion element; and a sub-detector having a plurality of detecting elements in line of the sub-wavelength dispersing direction for detecting the diffracted light of the standard light, wherein said main detector has a wavelength detection range and the standard wavelength of the standard light is outside of the wavelength detection range of said main detector.

* * * * *